United States Patent [19]
Feiken

[11] Patent Number: 6,058,402
[45] Date of Patent: *May 2, 2000

[54] METHOD OF MODIFYING THE FUNCTIONS PERFORMED BY A COMMAND SET OF A SMART CARD

[75] Inventor: Albertus Feiken, TD Amstelveen, Netherlands

[73] Assignee: Koninklijke KPN N.V., Groningen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/802,541

[22] Filed: Feb. 18, 1997

[30] Foreign Application Priority Data

Feb. 16, 1996 [EP] European Pat. Off. ............. 96200402

[51] Int. Cl.[7] ........................................ G06F 17/60
[52] U.S. Cl. ........................... 708/144; 235/380; 380/28; 705/41; 708/145
[58] Field of Search ..................... 364/709.12, 709.14; 707/104; 395/567; 380/28, 29; 235/380; 705/41; 708/144, 145

[56] References Cited

U.S. PATENT DOCUMENTS

| | | | |
|---|---|---|---|
| 4,236,204 | 11/1980 | Groves | 712/226 |
| 4,999,795 | 3/1991 | Lapeyre | 708/146 |
| 5,109,355 | 4/1992 | Yuno | 708/142 |
| 5,184,315 | 2/1993 | Lapeyre | 708/146 |
| 5,513,261 | 4/1996 | Maher | 380/277 |
| 5,578,808 | 11/1996 | Taylor | 235/380 |
| 5,592,619 | 1/1997 | Shona | 713/200 |
| 5,778,072 | 7/1998 | Samar | 380/30 |
| 5,802,519 | 9/1998 | De Jong | 707/100 |
| 5,818,030 | 10/1998 | Reyes | 235/492 |
| 5,841,076 | 11/1998 | Schwartz et al. | 177/25.13 |

FOREIGN PATENT DOCUMENTS

| | | |
|---|---|---|
| 0 383 268 | 8/1990 | European Pat. Off. . |
| 2667418 | 4/1992 | France . |

*Primary Examiner*—Kenneth S. Kim
*Attorney, Agent, or Firm*—Oblon, Spivak, McClelland, Maier & Neustadt, P.C.

[57] ABSTRACT

A method is disclosed of modifying and/or extending the command set (READ, WRITE) of a smart card. Use is made of the attribute tables (100, 200, 300) associated with certain files and with the commands of the existing command set to modify the functions of the commands. Thus, non-standard functions may be implemented without the need to use additional, i.e. non-standard instructions.

20 Claims, 4 Drawing Sheets

100

| ATTRIBUTE TABLE | | |
|---|---|---|
| File A | READ<br>WRITE<br>UPDATE<br>.<br>.<br>121 | [AC], [KEYNR.]<br>[AC], [KEYNR.]<br>[AC], [KEYNR.]<br>.<br>.<br>131 |
| 111 | | |
| File B | READ<br>WRITE<br>.<br>.<br>.<br>122 | [AC], [KEYNR.]<br>[AC], [KEYNR.]<br>.<br>.<br>.<br>132 |
| 112 | | |
| . . . . | . . . . | . . . . |

100

| ATTRIBUTE TABLE | | |
|---|---|---|
| File A<br><br><br><br><br>111 | READ<br>WRITE<br>UPDATE<br>.<br>.<br>.<br>121 | [AC], [KEYNR.]<br>[AC], [KEYNR.]<br>[AC], [KEYNR.]<br>.<br>.<br>.<br>131 |
| File B<br><br><br><br><br><br>112 | READ<br>WRITE<br>.<br>.<br>.<br>.<br>122 | [AC], [KEYNR.]<br>[AC], [KEYNR.]<br>.<br>.<br>.<br>.<br>132 |
| . . . . | . . . . | . . . . |

KEY TABLE

| KEYNR. | KEY | PRONR. |
|---|---|---|
| 1 | KEY 1 | 1 |
| 2 | KEY 2 | 3 |
| 3 | KEY 3 | 2 |
| . | . | . |
| . | . | . |
| . | . | . |

PROCEDURE TABLE

| PRONR. | PROCEDURE |
|---|---|
| 1 | [DES] |
| 2 | [NEW FUNCTION] |
| 3 | [RSA] |
| . | . |
| . | . |
| . | . |

Fig. 5

METHOD OF MODIFYING THE FUNCTIONS PERFORMED BY A COMMAND SET OF A SMART CARD

BACKGROUND OF THE INVENTION

The present invention relates to a method of modifying the command set of a smart card. More particularly, the present invention relates to a method of modifying individual command of a smart card.

A smart card, also called an IC card (IC=Integrated Circuit), is an electronic device for making payments. The integrated circuit of the card contains a microprocessor or the like for processing data. The processor of a smart card is normally provided with a command set comprising commands (such as Read, Write, Update, etc. for operating upon the (payment) data contained in the card. Often standardized commands are used, such as e.g. defined by European Norm EN726. However, such command set is necessarily limited with respect to the number and the scope of the commands. As electronic payment systems involving smart cards develop, the need often arises to add new functions to the card, or to alter existing functions. Such changes usually imply a modification of the command set of the smart card. This would normally involve a redesign of the integrated circuit of the card, which is not only expensive but renders existing cards obsolete. Furthermore, altering a standardized command set would jeopardize its compatibility with the standard.

For these and other reasons, the need arises to be able to modify the command set of smart cards without substantially deviating from the existing set of commands.

SUMMARY OF THE INVENTION

It is thus an object of the invention to overcome the above-mentioned and other disadvantages of the prior art and to provide a method which makes it possible to modify a set of commands of a smart card without adding commands. It is a further object of the invention to add new functions to a smart card, the new functions being based on the original set of commands.

In order to achieve these and other objectives, the invention provides a method of modifying the command set of a smart card, the smart card further comprising a memory for storing files and groups of attributes associated with the files, each attribute specifying properties of a command of the set, the method comprising the step of inserting into a group of attributes a new attribute corresponding with a command to be modified, said new attribute specifying a modified property of the respective command.

That is, according to the present invention, commands are modified by modifying their attributes. As the attributes may be organized in groups associated with specific files, the method of the present invention allows commands to be selectively modified, i.e., modified for specific files. An attribute typically specifies an access condition or a specific cryptographic key to be used by the command concerned. However, the attribute may contain machine code (or a pointer to machine code) specifying a further operation, the operation performing a specific function (such as a cryptographic procedure). By inserting a new operation, or a modified operation, in an attribute, the function of a command may be modified without altering the command itself.

It will be understood that the inserting of an attribute may involve the replacement of an existing attribute. In general, memory locations may be reserved for storing attributes. The insertion of a new attribute generally involves the storing of the new attribute in the corresponding memory location, in which case any information previously stored in the memory location is overwritten.

The method according to the invention may be applied in situations where the groups of attributes of the set of commands comprise a first table containing first attributes and a second table containing second attributes, the first table containing references to the second table and wherein a new attribute is inserted in the second table. Such a first table may e.g. comprise said specific cryptographic key, while the second table contains procedures (operations) to be used in conjunction with the command concerned. It should be noted that the first table may be referred to by a base table containing references. By inserting a new attribute in the second table, the modification is achieved with a minimal change in the attributes.

Modern smart cards may have at least two different data files, e.g. for different applications of the smart card. In such a case, a group of attributes may comprise subgroups associated with the respective data files. The invention allows a new attribute to be inserted in a limited number of subgroups, thus making command modifications specific for individual data files. This way, a great flexibility of commands may be achieved.

BRIEF DESCRIPTION OF THE DRAWINGS

FIG. 3 schematically shows an attribute table of a set of commands of a smart card, e.g. the smart card of FIG. 2.

FIG. 4 schematically shows a cryptographic key table associated with the attribute table of FIG. 3.

FIG. 5 schematically shows a procedure table associated with the attribute table of FIG. 3 and the cryptographic key table of FIG. 4.

DETAILED DESCRIPTION OF THE PREFERRED EMBODIMENTS

Figure 1:
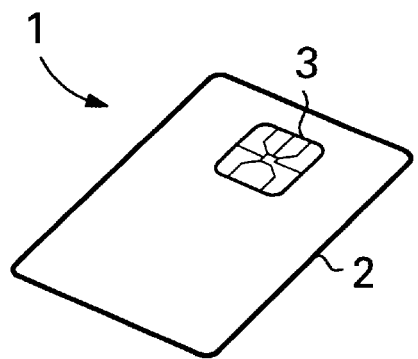
FIG. 1 shows, in perspective, a smart card as used for payment and identification purposes.

The smart card or IC card 1 shown schematically and by way of example in FIG. 1 comprises a substrate 2, in which an integrated circuit is embedded. The integrated circuit is provided with contacts 3 for contacting a card reader or the like. It should be noted that the present invention can also be applied in the case of so-called contactless smart cards.

Figure 2:
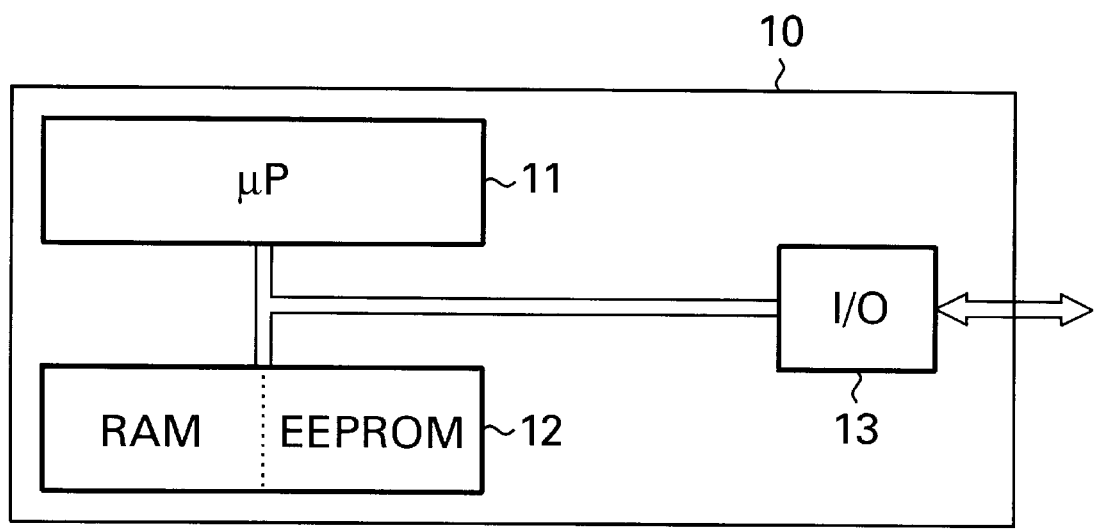
FIG. 2 schematically shows the integrated circuit of the smart card of FIG. 1.

The integrated circuit 10 shown schematically and by way of example in FIG. 2 comprises a processor 11, a memory 12 and an input/output circuit 13. The memory may comprise a volatile (RAM) memory part for temporarily storing data and a non-volatile memory part for permanently or semi-permanently storing data. The latter part is preferably an EEPROM (Electrically Erasable Read Only Memory) type memory. The data stored in the non-volatile part may contain both programming data (instructions, programs) and payment data, i.e. data relating to monetary transactions. It will be understood that a separate memory (not shown) may be provided to store the command set of the processor 11.

The processor 11 may be a microprocessor having a standardized set of commands, for example in accordance with European Norm EN726. It will be understood that other standard, or non-standard, set of commands, may also be used. The command set will be further explained with reference to FIG. 3.

The input/output circuit 13 handles the communication between the processor 11 and external devices (not shown) such as card readers. The input-output-circuit 13, which may contain suitable buffers, is connected with the processor 11 via a data bus. The processor 11 and the memory 12 may be connected by means of the same data bus.

Figure 6:
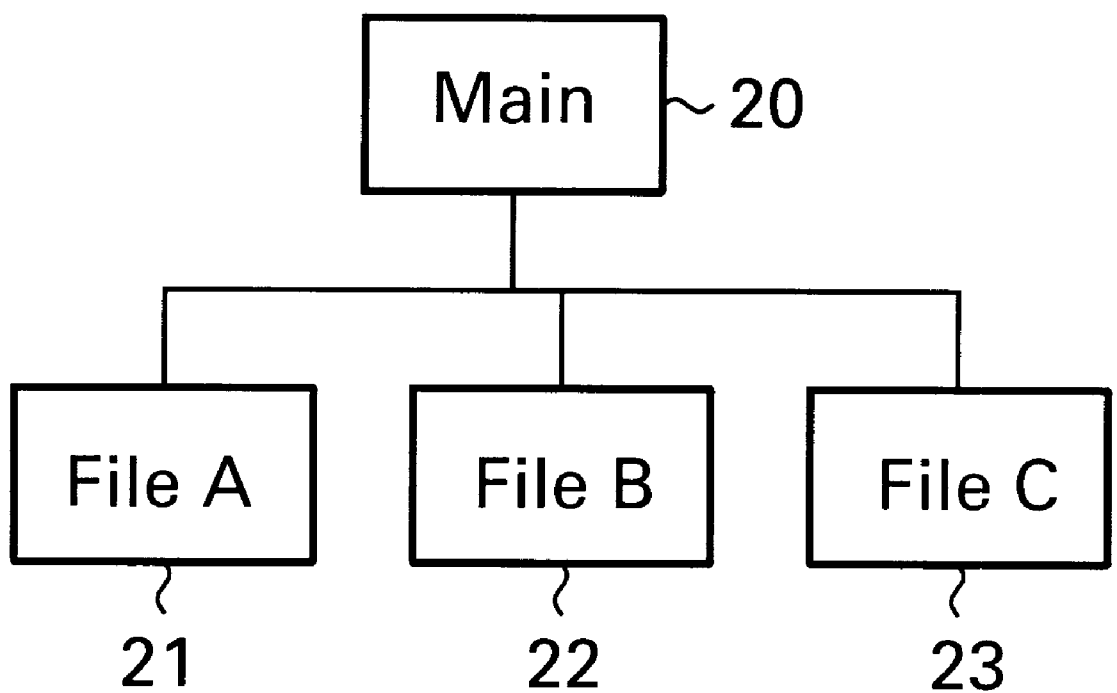
FIG. 6 schematically shows a hierarchical file structure of a smart card.

The attribute table shown schematically and by way of example in FIG. 3 and denoted in general by the reference numeral 100 comprises several parts, associated with different files (a possible file structure of the smart card will later be explained with reference to FIG. 6). A first part, associated with file A (21 in FIG. 6), comprises the fields 111, 121 and 131. The first field 111 contains the file indicator, here denoted by "File A". The second field 121 contains a command table, i.e., a table containing the command set of the smart card, or at least references to the commands of the command set. It will be understood that the commands themselves comprise the machine code executed by the processor. In the example shown, the commands "READ", "WRITE" and "UPDATE" are shown. The third field 131 contains attributes of the commands in field 121. That is, for each command of the second field 121 there may be an entry in the third field 131, the entry constituting a group of attributes which further specify the functioning of the command. The attributes may for example comprise access conditions and cryptographic key numbers, denoted in FIG. 3 by AC and KEYNR, respectively. Access conditions may comprise ALWAYS, NEVER, PROTECTED, and the like. Key numbers may refer to entries in the Key Table depicted in FIG. 4. The third field 131 of the table 100 may thus constitute a base table of attributes, which refers to further tables (depicted in FIG. 4).

Although the first, second and third fields of the attributes table 100 are shown in FIG. 3 for the sake of clarity as adjacent fields, in actual embodiments the fields may very well be stored at different, non-adjacent locations of the memory 12 of the smart card.

The attributes listed in field 131 all correspond with File A, as specified in field 111. That is, the attributes of field 131 are only valid for File A. Such a structure allows commands to have different functionalities for different (data) files. Such a file may contain data with respect to a specific application (function) of the smart card. Typical applications are "purse", "loyalty program", and "access", for making or receiving payments, collecting loyalty credits, and gaining access to buildings and the like, respectively. Even within such an application more than one data file may be used, and thus more than one associated group of attributes may exist. As a result of the attributes being specific to a data file, the function of a command may, at least for the parts defined by attributes, be specific to a data file. Thus, the access conditions of the command "READ" may vary between a file containing e.g. purse data (storage of electronic money) and a file containing personal data of the user of the smart card. This will further be explained with reference to FIGS. 4 and 5.

The actual access conditions, shown symbolically in FIG. 3 by AC, may be contained in the base attributes table 100, or may be contained in a separate table (not shown). Similarly, the keys (KEY 1, KEY 2, . . . ) shown in FIG. 4 may be contained in the attributes table 100. For the sake of the explanation of the invention, it will be assumed that the entries KEYNR, which may simply numbers (1, 2, . . . ), refer to the Key Table 200 of FIG. 4.

Each entry in the Key Table 200 of FIG. 4 contains a key number (KEYNR.), a cryptographic key (KEY 1, KEY 2, . . . ) and a procedure identification or procedure number (denoted PRONR in FIGS. 4 and 5). Each procedure identification refers in turn to an entry in the Procedure Table 300. Each entry in the Procedure Table 300 contains a procedure number and a procedure (operation), denoted in FIG. 5 by e.g. DES or RSA. Such a procedure may be a cryptographic procedure, such as DES and RSA, on data.

In accordance with the present invention, the commands of a smart card may be modified by modifying their attributes. Thus by modifying an entry in the Procedure Table 300, a new function or a modification of an existing function may be achieved. In FIG. 5, a new function (e.g. multiply data with a common factor, or subtract one from data) is entered at the second entry of the Procedure Table. Thus if in the Key Table 200 Key number 3 is selected, the Procedure Number refers to procedure number 2, being the new function. Each time a command is executed which involves the use of KEY 3, the new function will be invoked.

It will be understood that references to a new function can be made in various ways, e.g. directly from the table 100 of FIG. 3. Also, the Key Table 200 may contain "dummy" keys so as to allow the use of the table without actually using a key.

Instead of inserting the new function in the Procedure Table 300, a pointer may be inserted which points to a memory location where the new or modified code is stored.

As explained before, in the base attribute table (100 in FIG. 3) different attributes may exist for different files. The method according to the invention allows for a flexible command set by modifying attributes for individual data files.

Smart cards may comprise a hierarchical directory structure for organizing their files. An example of such a structure is shown in FIG. 6. A main file 20 has three subfiles 21, 22 and 23. That is, the main file may contain references to the subfiles, or such references are stored elsewhere (e.g. in a common directory). A group of attributes is associated with the main file 20. It is possible to have individual groups of attributes for all three subfiles 21, 22, and 23, as depicted in FIG. 3. However, when a group of attributes is associated with file 20, said group of attributes may be applicable to all files lower in the hierarchy relative to the main file 20. That is, the same group of attributes may be associated with files 21, 22 and 23 as, well. In other words, if a command is changed by modifying an attribute (of a group of attributes) associated with a certain file, the modification may hold for all files hierarchically lower relative to said file. This allows a command to be altered for e.g. a specific card application where this application involves several files.

As is explained above, the modification of commands is achieved in accordance with the present invention by replacing and/or modifying attributes. The method of the invention thus enables the use of standard commands (standard card functions) to effect non-standard operations. The invention also provides a modified set of commands of a smart card, as well as a smart card provided with a modified command set. The actual inserting of a new attribute into an attributes table is done by storing the new attribute at an appropriate memory location. The data representing the new attribute may be transferred from a computer via a card reader/writer to the memory of the card. Referring to FIG. 2, the data are transferred via the I/O unit: 13 to the memory 12 in a usual manner.

This application claims priority from European Patent Application Number 96200402.4 filed Feb. 16, 1996, the contents of which are incorporated herein by reference.

It will be understood by those skilled in the art that the embodiments described above are given by way of example only and that many modifications and additions are possible without departing from the scope of the present invention.

I claim:

1. A smart card comprising:

a processor having a command set; and a memory for storing (1) a first file, (2) a first attribute table associated with the first file and with the commands of the command set, and (3) computer code for:

determining a position in the first attribute table corresponding to a command of the command set to be modified, and modifying an attribute at the position in the first attribute table corresponding to the command of the command set to be modified without modifying any other attributes in the first attribute table.

2. The smart card according to claim 1, wherein the computer code for modifying comprises computer code for modifying an access condition selected from the group consisting of: always, never, and protected.

3. The smart card according to claim 1, wherein the computer code for modifying comprises computer code for modifying a key number referencing a cryptographic key table.

4. The smart card according to claim 1, further comprising a second attribute table referring to the first attribute table, and wherein the computer code for determining comprises computer code for using the second attribute table to find the position in the first attribute table.

5. The smart card according to claim 1, wherein the computer code for modifying comprises computer code for replacing an existing attribute.

6. The smart card according to claim 1, further comprising a second file, wherein the computer code for modifying comprises computer code for modifying the attribute of the first file without modifying an attribute of the second file.

7. The smart card according to claim 1, further comprising a second file lower in a file hierarchy than the first file, wherein the computer code for modifying comprises computer code for modifying the attribute of the first file and any other file lower in a file hierarchy than the first file.

8. The smart card according to claim 1, further comprising a second file, wherein the computer code for modifying comprises computer code for modifying the attribute and applying the attribute to all files in the memory.

9. The smart card according to claim 1, further comprising computer code for restricting access to the first file using an RSA encryption technique.

10. The smart card according to claim 1, further comprising computer code for restricting access to the first file using a DES encryption technique.

11. A method of modifying a function of a command in a command set of a processor of a smart card without adding commands, wherein the smart card includes a memory for storing a first file and a first attribute table associated with the first file and with the commands of the command set, the method comprising the steps of:

determining a position in a first attribute table corresponding to a command of the command set to be modified; and modifying an attribute at the position in the first attribute table corresponding to the command of the command set to be modified without modifying any other attributes in the first attribute table.

12. The method according to claim 11, wherein the step of modifying comprises the step of modifying an access condition selected from the group consisting of: always, never, and protected.

13. The method according to claim 11, wherein the step of modifying comprises the step of modifying a key number referencing a cryptographic key table.

14. The method according to claim 11, wherein the smart card further comprises a second attribute table referring to the first attribute table, and wherein the step of determining comprises using the second attribute table to find the position in the first attribute table.

15. The method according to claim 11, wherein the step of modifying comprises the step of replacing an existing attribute.

16. The method according to claim 11, wherein the memory of the smart card further comprises a second file, wherein the step of modifying comprises modifying the attribute of the first file without modifying an attribute of the second file.

17. The method according to claim 11, wherein the memory of the smart card further comprises a second file lower in a file hierarchy than the first file, wherein the step of modifying comprises modifying the attribute of the first file and any other file lower in a file hierarchy than the first file.

18. The method according to claim 11, wherein the memory of the smart card further comprises a second file, wherein the step of modifying comprises modifying the attribute and applying the attribute to all files in the memory.

19. The method according to claim 11, further comprising the step of restricting access to the first file using an RSA encryption technique.

20. The method according to claim 11, further comprising the step of restricting access to the first file using a DES encryption technique.

* * * * *